US006997590B2

(12) United States Patent
Garcia et al.

(10) Patent No.: US 6,997,590 B2
(45) Date of Patent: Feb. 14, 2006

(54) HEADLAMP FOR A MOTOR VEHICLE COMPRISING A MOVEABLE MASK EQUIPPED WITH LOCKING MEANS

(75) Inventors: José Garcia, Bobigny (FR); Jean-Claude Puente, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 184 days.

(21) Appl. No.: 10/791,933

(22) Filed: Mar. 2, 2004

(65) Prior Publication Data

US 2004/0174713 A1 Sep. 9, 2004

(30) Foreign Application Priority Data

Mar. 3, 2003 (FR) .................................. 03 02804

(51) Int. Cl.
*B60Q 1/06* (2006.01)
*F21V 11/18* (2006.01)

(52) U.S. Cl. ...................... 362/539; 362/512; 362/513

(58) Field of Classification Search ................ 362/512, 362/539, 513
See application file for complete search history.

(56) References Cited

U.S. PATENT DOCUMENTS

| | | | | |
|---|---|---|---|---|
| 6,425,683 | B1 * | 7/2002 | Kusagaya et al. | 362/512 |
| 6,575,609 | B1 * | 6/2003 | Taniuchi et al. | 362/512 |
| 6,607,295 | B1 * | 8/2003 | Hayakawa | 362/539 |
| 6,848,814 | B1 * | 2/2005 | Watanabe et al. | 362/465 |

FOREIGN PATENT DOCUMENTS

| | | |
|---|---|---|
| DE | 3806658 | 9/1989 |
| DE | 10121480 | 11/2002 |
| EP | 0428360 | 5/1991 |
| EP | 0864804 | 9/1998 |
| FR | 2796449 | 1/2001 |
| FR | 2809802 | 12/2001 |

OTHER PUBLICATIONS

French Search Report , dated Oct. 15, 2003.

* cited by examiner

*Primary Examiner*—Thomas M. Sember
*Assistant Examiner*—Ismael Negron
(74) *Attorney, Agent, or Firm*—Morgan & Finnegan, LLP

(57) ABSTRACT

The invention proposes a lighting headlamp for a motor vehicle, comprising a light source, a reflector of the elliptical type, a first focus of which is arranged in the vicinity of the source and a second focus of which is arranged in the vicinity of the focal plane of a convergent lens, and a movable mask which is mounted so as to pivot, with respect to a fixed mounting, about an overall transverse axis, and which is capable of occupying an angular occultation position, in which it is arranged substantially vertically in the vicinity of the focal plane of the lens so as to form a cutoff in the light beam produced by the headlamp, and a retracted angular position, a spring forcing the movable mask into its occultation position, wherein it also comprises at least one locking means acting between the mounting and the mask in order to hold the mask in its occultation position.

7 Claims, 2 Drawing Sheets

HEADLAMP FOR A MOTOR VEHICLE COMPRISING A MOVEABLE MASK EQUIPPED WITH LOCKING MEANS

FIELD OF THE INVENTION

The present invention concerns a lighting headlamp for a motor vehicle.

BACKGROUND OF THE INVENTION

The present invention concerns more particularly a lighting headlamp for a motor vehicle, comprising a light source, a reflector of the elliptical type, a first focus of which is arranged in the vicinity of the source and a second focus of which is arranged in the vicinity of the focal plane of a convergent lens, and a movable mask which is mounted so as to pivot, with respect to a fixed mounting, about an overall transverse axis, and which is capable of occupying an angular occultation position, in which it is arranged substantially vertically in the vicinity of the focal plane of the lens so as to form a cutoff in the light beam produced by the headlamp, and a retracted angular position, a spring forcing the movable mask into its occultation position.

The documents DE-A-38 06 658 and FR-A-2.796.449 disclose such a type of headlamp.

In the document FR-A-2.796.449 for example, an electromagnet acts on the mask by means of a control rod, so as to cause the pivoting of the mask about a transverse axis, with respect to its mounting, from its angular occultation position to its retracted angular position.

The mask is returned elastically to its occultation position by means of a spring and by the effect of a counterweight arranged in a portion of the mask situated under its transverse axis of pivot.

The occultation position is defined by abutment surfaces of the mask which come into axial contact against associated bearing surfaces of the mounting.

As the headlamp is provided to be used in a motor vehicle, it must be in a position to withstand the thermal and mechanical stresses specific to such a use.

However, it has been noted that, under certain vibration frequencies, the return force of the spring is not sufficient to keep the mask in the occultation position, by contact against the bearing surfaces. The mask then tends to move away from the bearing surfaces, allowing passage of the light rays which are emitted by the headlamp above the cutoff and which therefore cause dazzle for the drivers of vehicles travelling in the opposite direction.

The invention aims in particular to remedy this drawback.

SUMMARY OF THE INVENTION

With this aim, the invention proposes a headlamp of the type described previously, wherein it also comprises at least one locking means acting between the mounting and the mask in order to hold the mask in its occultation position.

According to other characteristics of the invention:

- the locking means comprises a magnetic attraction element;
- in the occultation position, the mask comes into axial contact, by at least one abutment surface made of ferrous alloy, against an associated bearing surface which is implemented in a first face of part of the mounting, the magnetic attraction element is arranged facing the bearing surface, on a second face opposite the first face, and this part of the mounting is produced from ferrous alloy, so that the magnetic attraction element holds the mask in its occultation position by magnetic attraction through the mounting;
- the mask comprises two abutment surfaces which are arranged respectively in the vicinity of the transverse ends of the mask, and which are associated respectively with two bearing surfaces of the mounting, and the mounting comprises two magnetic attraction elements which are associated respectively with the two bearing surfaces;
- the magnetic attraction element is a permanent magnet;
- the magnetic attraction element is an electromagnet which is operated in attraction mode so as to hold the mask in its occultation position;
- the locking means is a mechanical means.

Other characteristics and advantages of the invention will emerge from a reading of the following detailed description, for the understanding of which reference should be made to the accompanying drawings in which:

DESCRIPTION OF THE PREFERRED EMBODIMENTS

In the description that follows, identical, similar or analogous elements will be designated by the same reference numbers.

For the description of the invention, the vertical, longitudinal and transverse orientations according to the V, L, T reference frame indicated in the figures will be adopted on a non-limitative basis.

Figure 1:
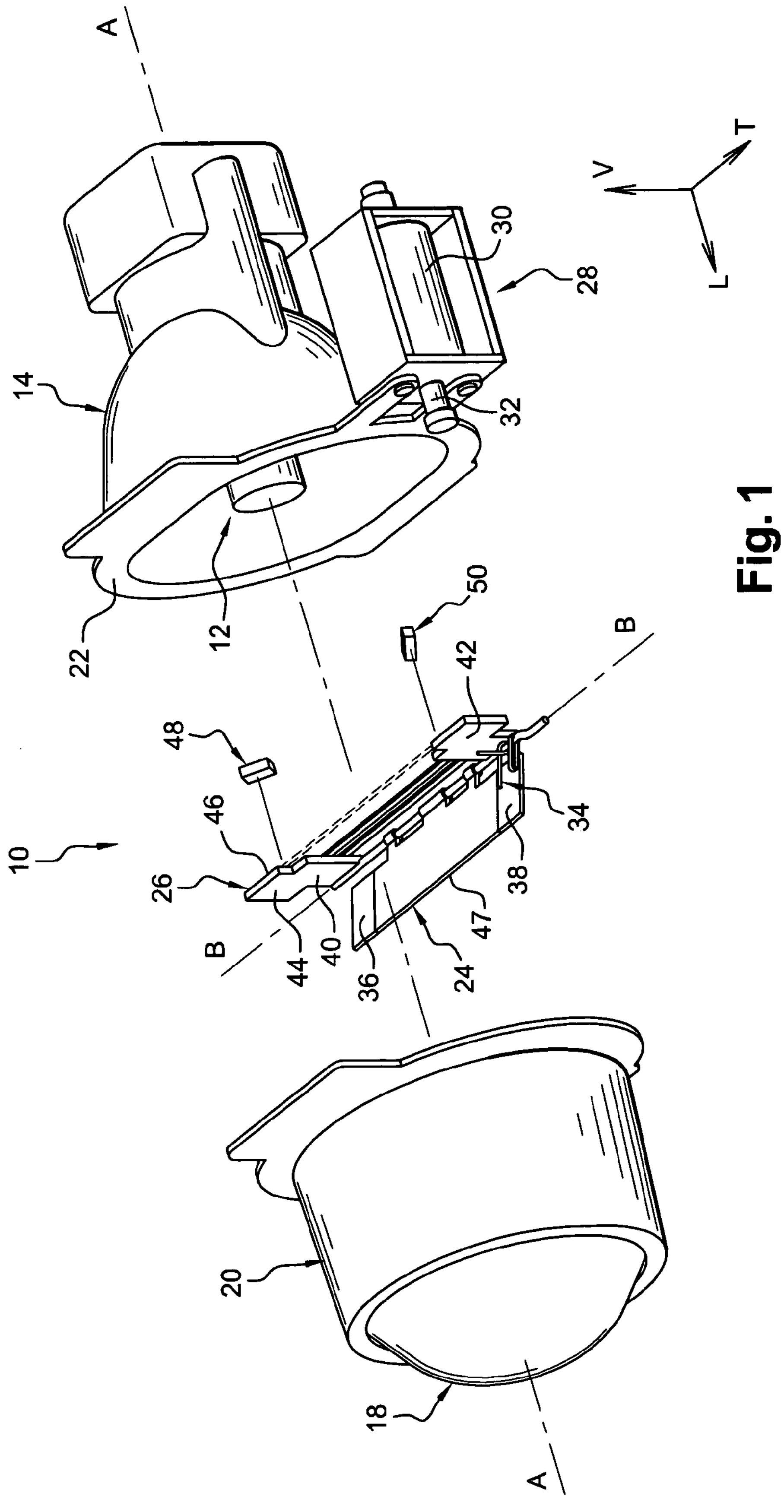
FIG. 1 is a perspective view which depicts a headlamp comprising a movable flap implemented in accordance with the teachings of the invention.

FIG. 1 depicts a headlamp 10 for a motor vehicle which comprises a lamp 12 mounted in the back of a reflector 14 of the elliptical type in such a way that the light source, for example the filament of an incandescent lamp, or the electric arc of a discharge lamp, is situated in the vicinity of a first focus of the reflector 14.

In the remainder of the description, use will be made on a non-limitative basis of an orientation from rear to front, along the longitudinal optical axis A—A of the headlamp 10, which corresponds to an orientation from right to left considering FIG. 1, that is to say in the direction of propagation of the light rays at the output of the headlamp 10.

The optical axis A—A is generally parallel to the longitudinal axis of the vehicle equipped with the headlamp 10.

The optical axis A—A is here substantially horizontal, and it can be defined for example by the two foci of the reflector 14.

The headlamp 10 comprises a convergent lens 18, for example a plane-convex lens, which is mounted at the front in an intermediate frame 20 fixed to a front transverse surface 22 of the reflector 14.

The focal plane of the lens 18 passes in the vicinity of the second focus of the reflector 14.

Conventionally, the headlamp 10 comprises a movable mask 24 which is inserted axially between the reflector 14 and the intermediate frame 20, in the vicinity of the focal plane of the lens 18.

The movable mask 24 is mounted able to pivot with respect to a mounting 26, about a transverse axis B—B, between an angular occultation position and a retracted angular position.

Figure 2:
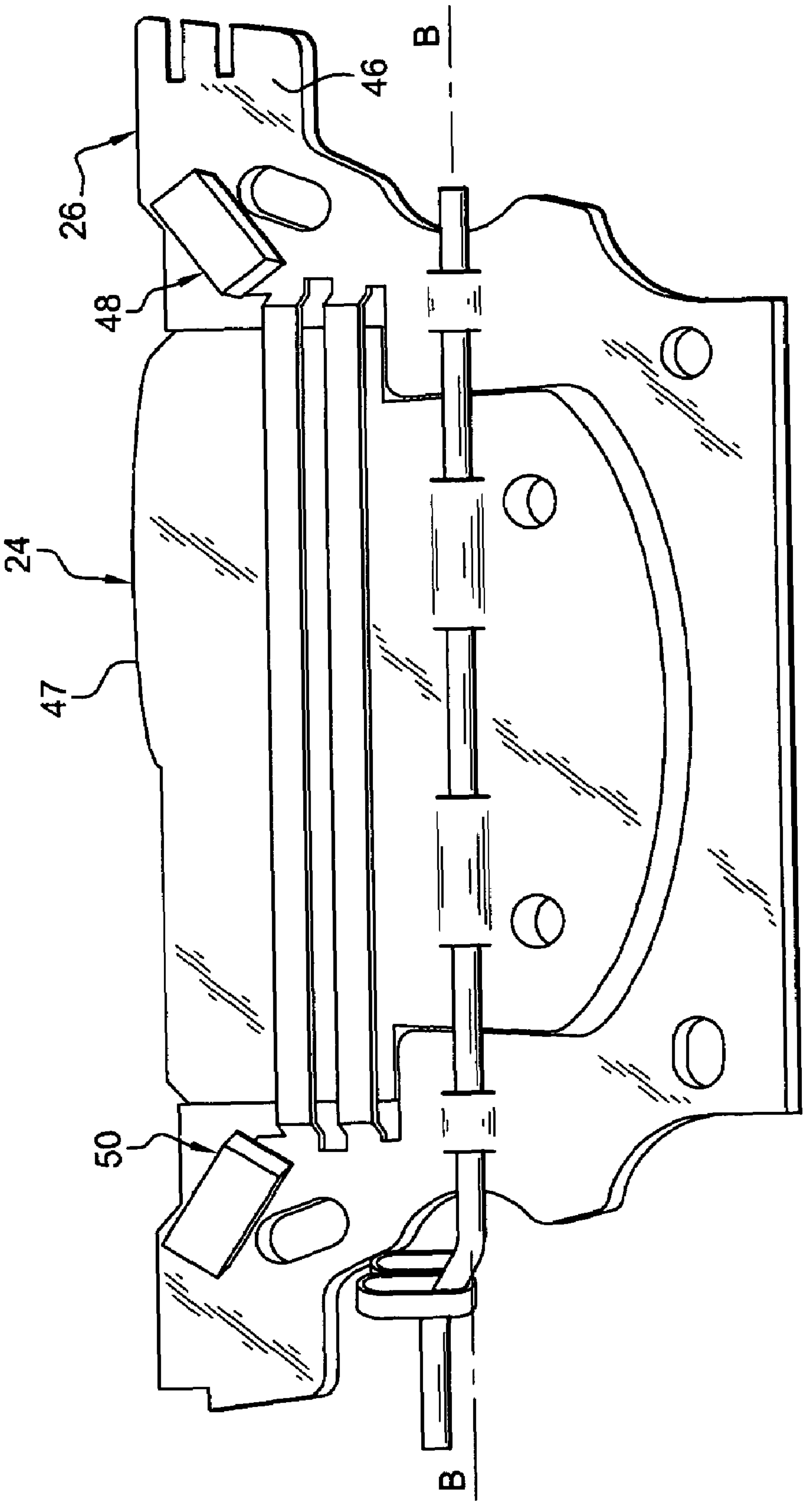
FIG. 2 is a rear view which depicts schematically the movable flap of FIG. 1 and its mounting.

In the angular occultation position, which is depicted in FIG. 2, the mask 24 is contained overall in a vertical transverse plane, and in the retracted angular position, which is depicted in FIG. 1, the mask 24 extends in a plane close to the horizontal plane, so as to allow passage of the majority of the light rays emitted by the lamp 12.

The mounting 26 is inserted axially between the intermediate frame 20 and the front transverse surface 22 of the reflector 14. The mounting 26 is fixed.

According to the embodiment depicted here, the headlamp 10 comprises an actuator 28 which is provided for causing the pivoting of the mask 24 from its occultation position to its retracted position.

The actuator 28 here comprises an electromagnet 30 capable of causing the axial displacement of a control rod 32, so as to cause the pivoting of the movable mask 24.

The mask 24 is here subjected to the action of a return spring 34, one end of which is captive in the mounting 26, and the other end of which forces the mask 24 towards its occultation position.

The spring 34 therefore forces the mask 24 towards the rear, into its occultation position, abutted on a fixed part of the mounting 26.

The spring 34 can be implemented in the form of a hairpin spring, the arms of which are fixed respectively on the mounting 26 and on the mask 24, a loop of the spring 34 encircling the axis of pivot B—B.

For further information on the structure and operation of the movable mask 24, reference can be made to the document FR-A-2.796.449 (in particular pages 6 and 7), which describes an example of means of rotating a mask about a transverse axis.

The mask 24 here comprises two transverse abutment surfaces 36, 38 which are provided for coming into axial contact respectively against two associated bearing surfaces 40, 42 which are implemented on the front transverse face 44 of part of the mounting 26.

The abutment surfaces 36, 38 and the bearing surfaces 40, 42 are here arranged in the vicinity of the transverse ends of respectively the mask 24 and the mounting 26.

Conventionally, the operation of the headlamp 10 is as follows.

In the rest position of the mask 24, that is to say the occultation position in which it is kept under the action of the spring 34, the headlamp 10 emits a statutory lighting beam with a cutoff.

This is because the upper edge 47 of the mask 24 comprises a profile adapted so as to form a cutoff of statutory shape, for example for producing a low beam.

When the mask 24 is operated towards its retracted position, by means of the actuator 28, then the mask 24 is situated mainly outside the path of the light rays emitted by the lamp 12. The headlamp 10 then produces a lighting beam with no cutoff, for example a high beam, or main beam.

In accordance with the teachings of the invention, the headlamp 10 comprises at least one locking means 48, 50 acting between the mounting 26 and the mask 24 in order to hold it in its occultation position.

The locking means here comprise magnetic attraction elements 48, 50.

The magnetic attraction elements 48, 50 are here permanent magnets which are fixed on the rear transverse face 46 of part of the mounting 26, facing the bearing surfaces 40, 42.

Advantageously, the mounting 26 is produced from ferrous alloy, the same as the mask 24.

When the mask 24 occupies its occultation position, the abutment surfaces 36, 38 are attracted by the bearing surfaces 40, 42 under the effect of the magnetic attraction force exerted by the magnets 48, 50 through the mounting 26.

Consequently, the magnets 48, 50 make it possible to keep the mask 24 stuck by its abutment surfaces 36, 38 against the bearing surfaces 40, 42.

Of course, the magnets 48, 50 are chosen so that the magnetic attraction force they exert on the mask 24, and the return force of the spring 34, are smaller than the pivoting force exerted by the actuator 28 on the mask 24, in order to operate it into the retracted position.

This is because, in order to operate the mask 24 into the retracted position, the actuator 28 must combat the return force of the spring 34 and the magnetic attraction force which is exerted by the magnets 48, 50.

The magnets 48, 50 and their magnetic attraction force can also be adapted according to the stresses, in particular vibratory stresses, to which the headlamp 10 is capable of being subjected.

According to a variant embodiment (not depicted) of the invention, only the parts of the mounting 26 which form the bearing surfaces 40, 42 are produced from ferrous alloy, it being possible for the remainder of the mounting 26 to be produced from another material, for example plastic.

Similarly, the movable mask 24 can comprise abutment surfaces 36, 38 made from ferrous alloy which are mounted on a component produced from another material.

According to a variant embodiment of the invention (not depicted), the permanent magnets 48, 50 can be replaced by electromagnets.

The electromagnets are then operated in attraction mode so as to hold the mask 24 in its occultation position.

According to another variant of the invention (not depicted), which corresponds to a simple mechanical reversal of the embodiment described previously, the magnets 48, 50 can be fixed on the mask 24 and exert their magnetic attraction force on the bearing surfaces 40, 42.

One advantage of the headlamp 10 according to the invention is that the locking system 48, 50 is easily adaptable to mass-produced components, without requiring complex modifications.

Another advantage of the invention is that, in the case of failure of the actuator 28 or the spring 34, the mask 24 is kept in the occultation position by the locking means 48, 50, which is preferable to a retracted position which can lead to dazzle for vehicles travelling in the opposite direction.

According to other variant embodiments of the invention (not depicted), the locking means 48, 50, here of the electromagnetic type, can be replaced by mechanical locking means, for example by an interlocking device, or by a "Velcro™" device, or else by a suction device, these mechanical means acting between the mounting 26 and the mask 24.

It should be noted that the invention can be adapted to an existing occultation device, for example the one described in the document FR-A-2.796.449.

Of course, the mounting 26 can comprise a single locking means 48 or 50.

What is claimed is:

1. Lighting headlamp for a motor vehicle, comprising:

a light source;

a convergent lens;

an elliptical reflector, a first focus of the reflector is arranged in the vicinity of the light source and a second focus of the reflector is arranged in the vicinity of the focal plane of the convergent lens;

a fixed mounting having a first face, and second face opposite the first face;

a movable mask pivotably mounted, with respect to the fixed mounting, about an overall transverse axis, the movable mask pivotable between an angular occultation position, in which it is arranged substantially vertically in the vicinity of the focal plane of the lens forming a cutoff in the light beam produced by the headlamp, and a retracted angular position;

a spring forcing the movable mask into its occultation position; and at least one locking means acting between the mounting and the mask, for holding the mask in the occultation position.

2. Headlamp according to claim 1, wherein the locking means is a mechanical means.

3. Headlamp according claim 1, wherein the locking means comprises a magnetic attraction element.

4. Headlamp according to claim 3, wherein the magnetic attraction element is a permanent magnet.

5. Headlamp according to claim 3, wherein the magnetic attraction element is an electromagnet which is operated in attraction mode so as to hold the mask in its occultation position.

6. Headlamp according to claim 3, further comprising:

at least one abutment surface formed on the mask and made of a ferrous alloy, the abutment surface contacting an associated bearing surface located in the first face of the mounting, when the mask is in the occultation position;

the magnetic attraction element is arranged facing the bearing surface, on the second face of the fixed mounting, and the bearing surface is produced from ferrous alloy, so that the magnetic attraction element holds the mask in its occultation position by magnetic attraction through the mounting.

7. Headlamp according to claim 6, further comprising:

two abutment surfaces formed on the mask and arranged respectively in the vicinity of the transverse ends of the mask, and associated with two respective bearing surfaces of the mounting, and wherein the mounting comprises two magnetic attraction elements associated respectively with the two bearing surfaces.

* * * * *